(12) United States Patent
Ackerman et al.

(10) Patent No.: US 9,330,464 B1
(45) Date of Patent: May 3, 2016

(54) DEPTH CAMERA FEEDBACK (71) Applicant: MICROSOFT TECHNOLOGY LICENSING, LLC, Redmond, WA (US)

(72) Inventors: Nathan Ackerman, Seattle, WA (US); Andrew C. Goris, Loveland, CO (US); Amir Nevet, Haifa (IL); David Mandelboum, Rakefet (IL); Asaf Pellman, Beit-Yehoshua (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/569,562

(22) Filed: Dec. 12, 2014

(51) Int. Cl.
*G06K 7/10* (2006.01)
*G06T 7/00* (2006.01)
*G01S 17/89* (2006.01)
*G01S 17/08* (2006.01)
*G06F 3/01* (2006.01)
*G06K 9/00* (2006.01)

(52) U.S. Cl.
CPC ............... *G06T 7/002* (2013.01); *G01S 17/08* (2013.01); *G01S 17/89* (2013.01); *G06F 3/011* (2013.01); *G06F 3/017* (2013.01); *G06K 9/00335* (2013.01)

(58) Field of Classification Search
CPC .......... G06K 7/10732; G06K 7/10811; G06K 7/10861
USPC ............................................ 235/454, 462.24
See application file for complete search history.

(56) References Cited

U.S. PATENT DOCUMENTS

| | | | |
|---|---|---|---|
| 5,621,494 A | 4/1997 | Kazumi et al. | |
| 7,075,578 B1 | 7/2006 | Kubo | |
| 7,286,166 B2 | 10/2007 | Smith et al. | |
| 8,073,321 B2 | 12/2011 | Furlan | |
| 8,157,174 B2 | 4/2012 | Kotlarsky et al. | |
| 8,217,949 B1* | 7/2012 | Carpenter et al. | 345/474 |
| 8,358,370 B2 | 1/2013 | Kleihorst et al. | |
| 8,705,151 B2 | 4/2014 | Dicarlo | |
| 8,761,594 B1 | 6/2014 | Gross et al. | |
| 8,864,035 B2* | 10/2014 | Fukuba | 235/462.13 |
| 2003/0038933 A1 | 2/2003 | Shirley et al. | |
| 2011/0157584 A1 | 6/2011 | Lin et al. | |
| 2012/0141104 A1* | 6/2012 | DeLuca | 396/158 |
| 2013/0131836 A1* | 5/2013 | Katz et al. | 700/12 |
| 2013/0201288 A1 | 8/2013 | Billerbeck et al. | |
| 2013/0278576 A1 | 10/2013 | Lee et al. | |
| 2014/0049609 A1 | 2/2014 | Wilson et al. | |

OTHER PUBLICATIONS

Yi, Xilin, "3D Object Depth Recovery From Highlights Using Active Sensor and Illumination Control", In IEEE Computer Society Conference on Computer Vision and Pattern Recognition, Jun. 23, 1998, 7 pages.

* cited by examiner

*Primary Examiner* — Seung Lee
(74) *Attorney, Agent, or Firm* — Micah Goldsmith; Judy Yee; Micky Minhas (57) ABSTRACT

Embodiments are disclosed that relate to controlling a depth camera. In one example, a method comprises emitting light from an illumination source toward a scene through an optical window, selectively routing a at least a portion of the light emitted from the illumination source to an image sensor such that the portion of the light is not transmitted through the optical window, receiving an output signal generated by the image sensor based on light reflected by the scene, the output signal including at least one depth value of the scene, and adjusting the output signal based on the selectively routed portion of the light.

20 Claims, 6 Drawing Sheets

DEPTH CAMERA FEEDBACK

BACKGROUND

Electronic imaging systems include a variety of electrical and optical components to enable a scene to be imaged. One example of such an electronic imaging system is a depth camera capable of performing three-dimensional imaging of a scene. Typically, output from a depth camera is highly dependent on the state of its electrical and optical components. As such, output from the depth camera may vary as changes to voltage, temperature, and physical forces in the camera occur.

SUMMARY

Embodiments are disclosed that relate to controlling a depth camera. In one example, a method comprises emitting light from an illumination source toward a scene through an optical window, selectively routing at least a portion of the light emitted from the illumination source to an image sensor such that the portion of the light is not transmitted through the optical window, receiving an output signal generated by the image sensor based on light reflected by the scene, the output signal including at least one depth value of the scene, and adjusting the output signal based on the selectively routed portion of the light.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
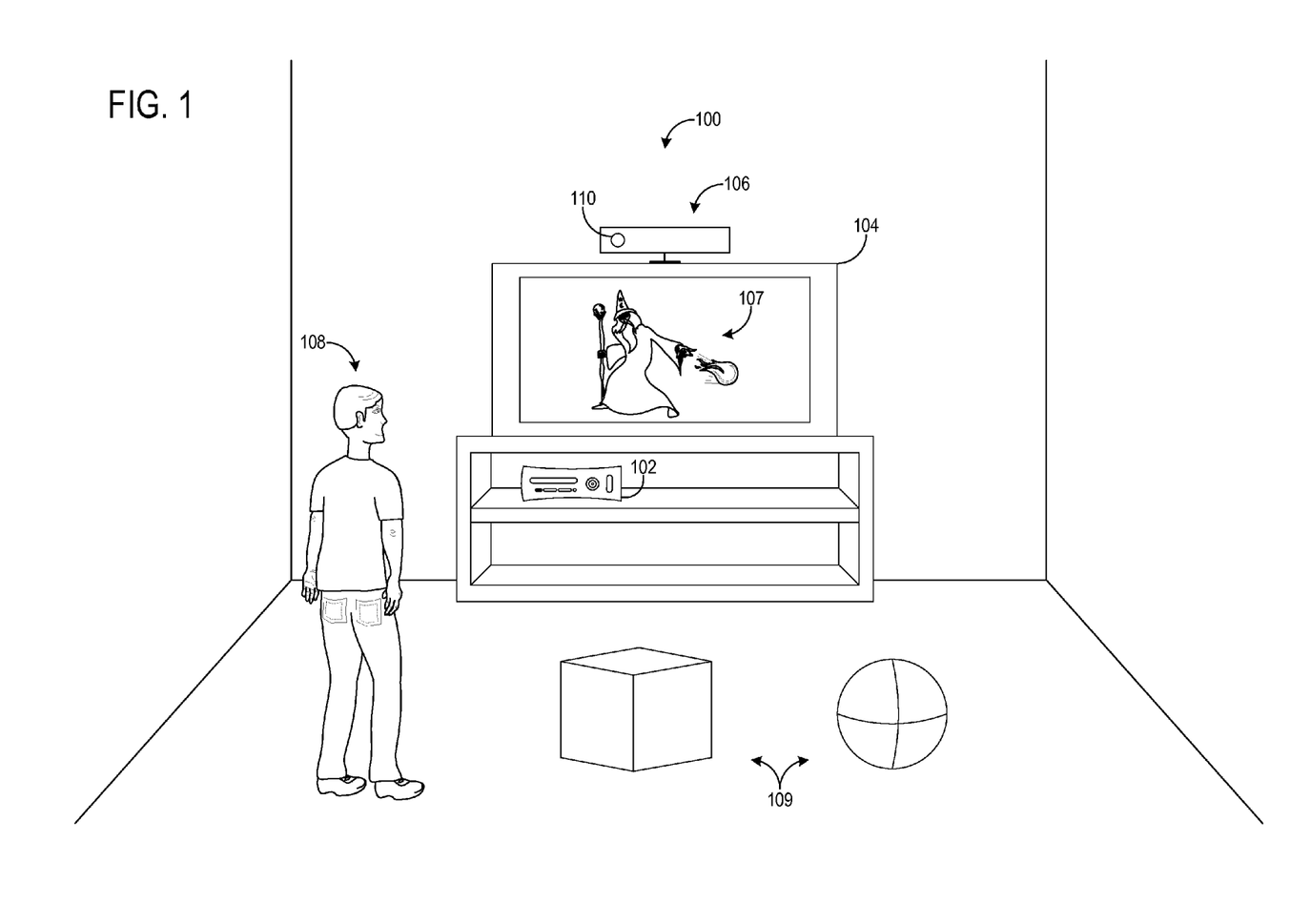
FIG. 1 shows aspects of an example environment.

FIG. 1 shows aspects of an example environment 100. Environment 100 includes a computing system 102 to which a display device 104 and a sensor system 106 are operatively coupled. In some implementations, computing system 102 may be a videogame console or a multimedia device configured to facilitate consumption of multimedia (e.g., music, video, etc.). In other examples, computing system 102 may be a general-purpose computing device, or may take any other suitable form. Example hardware that may be included in computing system 102 is described below with reference to FIG. 5. Computing system 102 may be operatively coupled to display 104 and sensor system 106 via any suitable wired or wireless communication link.

Display device 104 is configured to output visual content received from computing system 102, and also may output audio content. Display device 104 may be any suitable type of display, including but not limited to a liquid-crystal display (LCD), organic light-emitting diode (OLED) display, cathode ray tube (CRT) television, etc. While shown in the depicted example as a large-format display, display 104 may assume other sizes, and may comprise two or more displays. Other types of display devices, including projectors and mobile device displays, are also contemplated.

In some implementations, computing system 102 may be configured to accept various forms of user input from one or more users 108. As such, traditional user-input devices such as a keyboard, mouse, touch-screen, gamepad, or joystick controller (not shown in FIG. 1) may be operatively coupled to computing system 102. Computing system 102 may also be configured to accept natural user input (NUI) from at least one user. NUI input may comprise gesture input and/or vocal input from user 108, for example. As shown in the illustrated example, NUI received from user 108 may affect aspects of a game application 107 running on computing system 102. Aspects of virtually any type of application running on computing system 102 may be affected by NUI received from user 108, however.

While sensor system 106 may track one or more users 108, the sensor system may alternatively or additionally collect data on non-human subjects, which may or may not be inanimate objects. As such, objects 109 are shown in environment 100, which may be imaged by sensor system 106.

Sensor system 106 may determine the depth of objects in environment 100 via a depth camera 110. As used herein, "depth" refers to the distance from a region of an environment imaged by a depth camera to the depth camera. Depth may be defined as a coordinate parallel to an optical axis of the depth camera, for example, that increases with increasing distance from the sensor system. In some implementations, depth camera 110 may output depth maps comprising a plurality of pixels each having a depth value indicating the depth of a surface imaged by its associated pixel. Depth maps may be generated on a persistent basis (e.g., at 30 frames per second) to enable subject and/or object tracking on a real-time basis. Example depth-finding technologies are described below with reference to FIG. 2.

While environment 100 is shown as a home entertainment environment, it will be understood that the approaches disclosed herein may be employed in other environments, such as professional and academic settings, for example. In some implementations, sensor system 106 may be used to three-dimensionally image one or more subjects in a scene and provide output reflective of the three-dimensional imaging to a computing device not coupled to a display. The computing device may be coupled to the sensor locally or remotely. A non-limiting example of such a configuration is the use of sensor system 106 to determine the depth of objects in a construction site.

Figure 2:
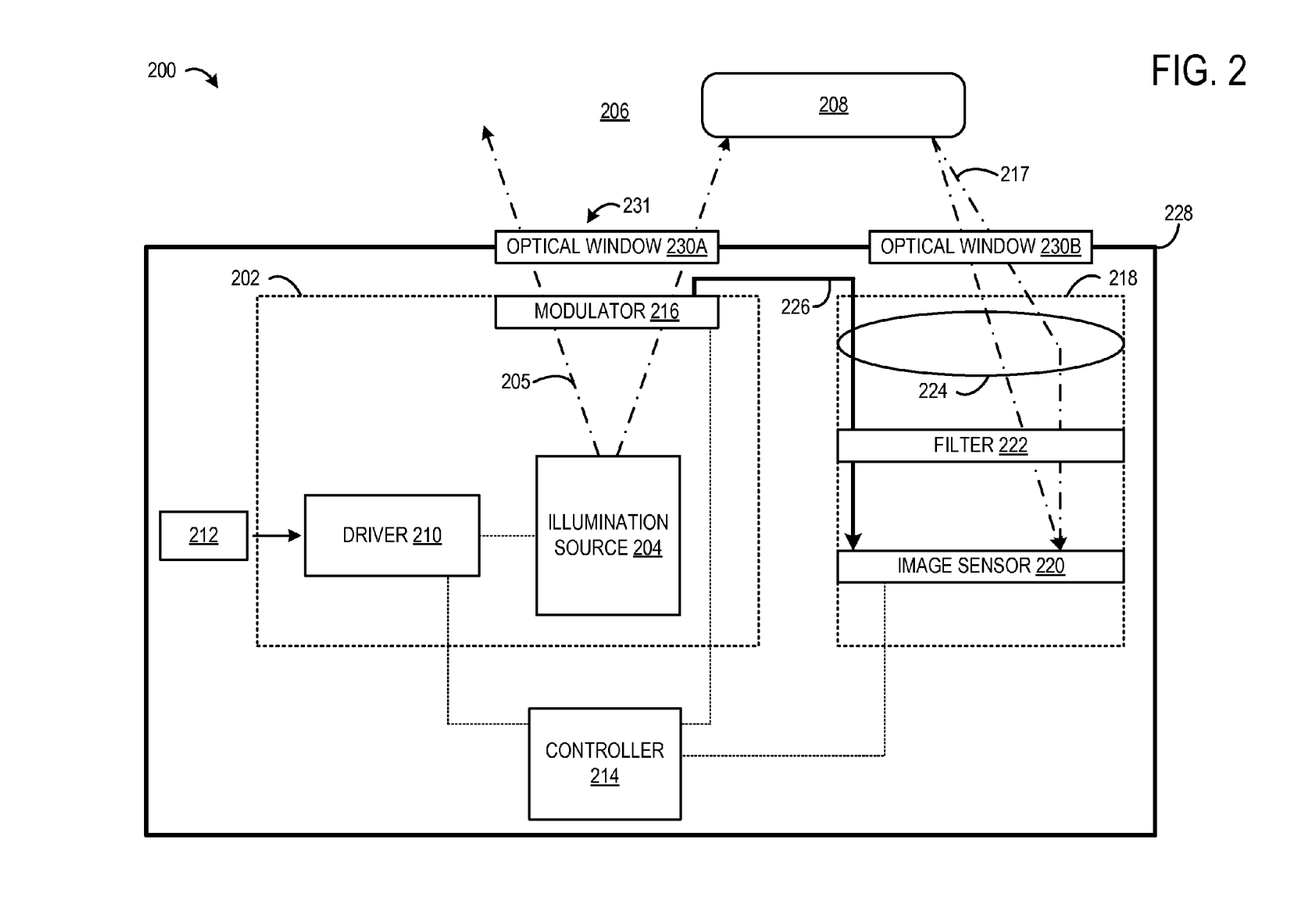
FIG. 2 schematically shows an example depth camera.

Turning now to FIG. 2, an example depth camera 200 is schematically shown. Depth camera 200 may be depth camera 110 of sensor system 106, for example. As shown, depth camera 200 includes an illumination package 202 having an illumination source 204. Illumination source 204 is a suitable light source for generating illumination light 205 to be projected into an environment 206 such that light reflected by objects (e.g., object 208) may be received and analyzed to determine the depth of the objects as described in further detail below.

In some implementations, illumination source 204 may employ a laser diode to emit infrared wavelengths of light toward environment 206. A driver circuit 210 may be electrically coupled to illumination source 204 and configured to deliver an operating current to the illumination source. Driver circuit 210 in turn may be configured to receive an input signal 212 such that the operating current delivered to illumination source 204 is based on the input signal. A controller 214 operatively coupled to driver circuit 210 may generate input signal 212.

Depth camera 200 further includes a modulator 216 configured to modulate illumination light 205 emitted by illumination source 204. In some implementations, modulator 216 may be a temporal modulator such as a shutter whose opening and closing timings are determined by controller 214. The times at which the shutter is opened and closed may be synchronized with the times at which light pulses are emitted by illumination source 204 while accounting for delays between the shutter and illumination source. In this example illumination source 204 may be driven to emit illumination light 205 as a pulse train that corresponds to input signal 212, which may be a modulated input signal. Modulator 216 may utilize an electrostatic shutter to enable high shutter speeds (e.g., on the order of 1 ns). As light projected into environment 206 is temporally modulated in this example, depth camera 200 may accordingly be referred to as a time-of-flight (TOF) depth camera.

For implementations in which depth camera 200 is a TOF depth camera, the depth of object 208 in environment 206 may be determined based on the intensity of reflected light 217 reflected by the object. More specifically, the dependence of the intensity of reflected light on arrival time may be leveraged to determine object depth by comparing the intensity of received light to the intensity of light blocked by the shutter. Alternatively or additionally, illumination light 205 may be modulated with a radio-frequency (RF) carrier. Then, the phase shift of the RF carrier in reflected light may be measured to determine object depth.

In other implementations, modulator 216 may be a spatial modulator configured to spatially modulate illumination light 205. In this example, illumination light 205 may be spatially modulated such that a structured illumination pattern comprising numerous discrete features (e.g., lines, dots, etc.) is projected into environment 206. Spacings between adjacent features in the illumination pattern of reflected light 217 may be analyzed to determine object depth. In this example, depth camera 200 may be referred to as a "structured light" depth camera.

Depth camera 200 also includes an image sensor module 218 to analyze reflected light 217 so that the depth of object 208 may be determined. Image sensor module 218 includes an image sensor 220, which may be any suitable image sensor for analyzing reflected light 217, such as a charge-coupled device (CCD) or complementary metal-oxide-semiconductor (CMOS) sensor. In some examples, image sensor 220 may have a photosensitive surface whose optical properties are tuned to enable signal generation responsive to light having a certain range of wavelengths (e.g., infrared wavelengths). Various operational aspects of image sensor 220 may be controlled by controller 214, such as the timing and duration of integrations performed by the image sensor. For implementations in which depth camera 200 is a TOF depth camera, the timing of integrations may be tied to the timing of pulse emission by illumination source 204. Alternative configurations are possible, however, in which a dedicated driver circuit controls the operation of image sensor 220. The driver circuit may be a substrate driver, for example.

Image sensor module 218 further includes a filter 222 positioned optically upstream image sensor 220 and configured to filter at least some portion of reflected light 217. Filter 222 may be an infrared band pass filter, for example, though the filter may be tuned to other wavelengths. An optical element 224 is also positioned in image sensor module 218 optically upstream filter 222. Optical element 224 is depicted as a convergent lens in FIG. 2, focusing and directing reflected light 217 toward image sensor 220.

Output from depth camera 200—e.g., depth values—is highly dependent on the optical properties of the optical components through which light propagates and on the electrical properties of the electrical components that generate and receive light. To enable accurate depth sensing, depth camera 200 may be calibrated prior to deployment in environment 206, for example in a manufacturing environment. Depth camera 200 may be specifically calibrated according to a variety of precise parameters that affect depth sensing, such as distances between adjacent optical components, electrical component supply voltages, the intensity and spectral power distribution of illumination light 205, etc. The calibration may further account for environmental factors that may affect depth sensing, such as temperature, which can alter the geometry and relative positioning of components in depth camera 200.

Calibration in this manner may allow aspects of the operation of depth camera 200 that deviate from ideal operation to be characterized and compensated. Illumination light 205, for example, may have undesired properties; in the TOF configuration, light pulses emitted by illumination source 204 may deviate from an ideally square shape. When configured as a shutter, opening and closing timings of modulator 216 may deviate from those commanded, leading to an imperfect synchronization between the shutter and light pulses emitted by illumination source 204, in turn degrading depth sensing.

While the heterogeneity between operation of illumination source 204 and modulator 216 described above may be compensated via calibration during manufacture, deployment of depth camera 200 in environment 206 exposes the depth camera to a plurality of factors that can cause camera parameters to deviate from their calibrated values. Ambient temperature may significantly vary over time in environment 206, which as described above can alter the geometry and relative positioning of depth camera components. Other factors such as ambient pressure and humidity, aging of illumination source 204, and mechanical stress due to bumps and falls may alter the operation of depth camera 200 when deployed in environment 206. Without the ability to compensate these changes, the accuracy of depth sensing by depth camera 200 may decrease over time.

The operational drift of a depth camera described above can result in errors in depth values determined by the depth camera. As a non-limiting example, a delay time between operation of illumination source 204 (e.g., pulse generation) and modulator 216 (e.g., shutter opening responsive to pulse generation) is determined to be 10 ns during initial calibration. Following deployment in environment 206, however, mechanical and temperature variations have caused the delay to become 11 ns, manifesting as an error in depth values of 16 cm.

FIG. 2 shows the inclusion of an optical path 226 to facilitate the continual compensation of changes in operation of depth camera 200 throughout its operational life. Optical path 226 is specifically configured to redirect illumination light 205 that would otherwise be emitted into environment 206, and potentially reflected by objects therein, back toward image sensor 220. In the depicted configuration, optical path 226 is positioned optically downstream modulator 216 such that at least a portion of light transmitted and modulated by the modulator is fed back to image sensor 220. Optical path 226 also resides within a housing 228 that at least partially encloses the aforementioned optical and electrical components of depth camera 200. Two optical windows 230A and 230B, which are embedded in housing 228, provide optical interfaces between depth camera 200 and environment 206. In particular, optical window 230A allows modulated illumination light 205 to pass from the interior of depth camera 200 to environment 206, while optical window 230B allows reflected light 217 to pass from the environment back into the depth camera for analysis. Thus, in this configuration, at least a portion of illumination light 205 may be selectively routed from illumination source 204 via optical path 226 to image sensor 220 such that the portion of the illumination light is not transmitted through optical window 230A. Optical windows 230A and 230B may correspond to regions of the outer surface of housing 228 (e.g., boundary 231) separating the housing from environment 206, and may include respective optically transmissive elements upstream of the optical windows which may be comprised of any suitable material (e.g., glass) that is transmissive to a desired range of wavelengths. In other embodiments, optical windows 230A and 230B may be hollow, optically transmissive openings in housing 228. Generally, boundary 231 illustrates how a portion of illumination light 205 may be fed back to image sensor 220 before the portion of the illumination light would otherwise cross the boundary and be emitted into environment 206.

Optical path 226 provides timing information regarding illumination light 205; because the length of the optical path, and the velocity of light travelling therein (based on known material properties of the optical path) are known, the time of flight of light traveling through the optical path can be determined. Light traveling through optical path 226 may be referred to herein as "calibration", "feedback", or "redirection" light.

In some implementations, the time of flight of calibration light may be determined during initial calibration of depth camera 200. This initial time of flight may thus be used as a nominal time of flight that represents nominal or expected operation of depth camera 200. Changes to this time of flight, which may be determined by comparing the time of light generation in illumination source 204 to the time of reception of the calibration light at image sensor 220, may then be interpreted as deviation of depth camera 200 from its nominal operational state assumed during initial calibration. As in this example the time of flight of calibration light in optical path 226 may be affected by substantially all the electrical and optical components in depth camera 200, operational drift of the depth camera may be easily detected by measuring a single parameter, in turn allowing compensation of the operational drift and enabling a return to nominal depth sensing.

Other parameters of depth camera 200 may be monitored to assess operational drift therein. For implementations in which depth camera 200 is a TOF depth camera, the delay between illumination source 204 and modulator 216 may be measured—e.g., the delay between the time at which the illumination source is driven to generate a light pulse and the time at which the modulator shutter is opened. Alternatively or additionally, the convolution of light pulses and their corresponding shutter profiles may be determined and compared to a nominal convolution associated with nominal operation of depth camera 200. A shutter profile may indicate the shutter position as a function of time, for example. Determination of one or both of the aforementioned delay and convolution may leverage the measured time of flight of calibration light in optical path 226, for example.

Figure 3:
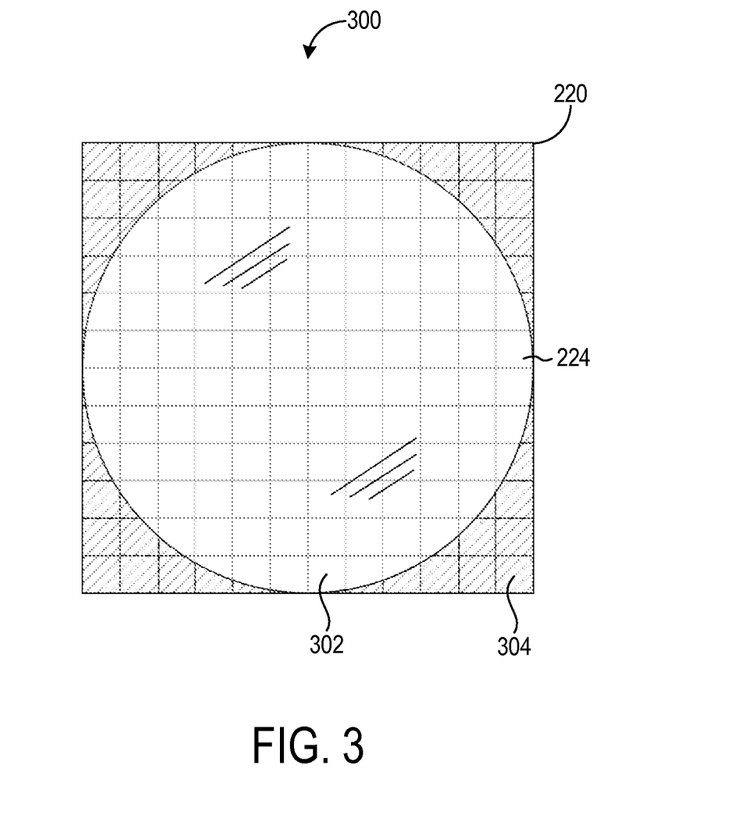
FIG. 3 shows an example optical arrangement.

Calibration light propagating in optical path 226 may be directed to image sensor 220 in various suitable manners. In some implementations, a dedicated portion of image sensor 220 may receive calibration light but not reflected light 217. FIG. 3 shows an example optical arrangement 300 illustrating such a configuration. FIG. 3 specifically shows a front view of optical arrangement 300 as perceived along an optical axis about which image sensor 220 and optical element 224 may be positioned coaxially. In this example, the diameter of optical element 224 is equal to the width of image sensor 220, though the diameter may be less or greater than the width in other examples. As such, the entire photosensitive area of image sensor 220 is not overlapped by optical element 224. Thus, an interior region 302 corresponding to the photosensitive area overlapped by optical element 224 will receive reflected light 217, while a complementary peripheral region 304 (emphasized in FIG. 2 by shading) corresponding to the photosensitive area not overlapped by the optical element will not receive the reflected light. This peripheral region 304 may instead be configured to receive the calibration light from optical path 226. Controller 214, for example, may accordingly associate output from peripheral region 304 with calibration light and output from interior region 302 with reflected light 217. In this configuration, output from a first region of image sensor 220 may be used to modify output from a second, different region of the image sensor.

It will be appreciated that optical arrangement 300 is provided as an example and is not intended to be limiting in any way. While peripheral region 304 is shown as being located along the perimeter of image sensor 220, in other examples the peripheral region may be located elsewhere. In some implementations, optical element 224 may overlap the entirety of the photosensitive surface of image sensor 220. An additional optical element may be positioned between optical element 224 and image sensor 220 such that at least a portion of the image sensor is prevented from receiving reflected light 217. The blocked portion may then be dedicated to the reception of calibration light. In yet other implementations, a photosensitive surface separate from that of image sensor 220 may be provided and dedicated to the reception of calibration light. The two photosensitive surfaces may be provided on the same or different packages.

Other approaches to measuring calibration light and reflected light 217 may be employed. In some examples, a region of image sensor 220 may not be dedicated to the reception of calibration light. Instead, capture of reflected light 217 may be selectively interrupted by capture of calibration light. The time and frequency of such interruption may be adjustable and selected based on various criteria, including a desired frequency of depth sensing of objects in environment 206 and a desired frequency of calibration. In some examples, the same photosensitive region of image sensor 220 used to capture reflected light 217 may be used to capture calibration light, though in other examples the regions may differ. In this implementation, controller 214 may be configured to interpret calibration frames different from reflected light frames so that depth values indicated by the reflected light frames may be adjusted based on calibration data in the calibration frames.

While light capture of reflected light 217 may be interrupted by calibration light capture, objects in environment 206 may nevertheless affect captured calibration light. Objects having relatively shallow depths may particularly affect captured calibration light—as a non-limiting example, for a distance of 1 cm between optical window 230A and modulator 216, objects having a depth (e.g., distance between object and optical window 230B) equal to or less than 0.5 m may unacceptably affect calibration frames. Accordingly, a determination may be made as to whether any objects are within a threshold depth from depth camera 200 before capturing calibration frames.

Optical path 226 may assume a variety of suitable forms. For example, optical path 226 may be a light pipe or trace positioned on a circuit board and configured to guide light from illumination source 204 to image sensor 220. In other implementations, optical path 226 may be a waveguide, which may be integrated in a printed circuit board (PCB). The PCB may be positioned adjacent illumination source 204 and configured to support other camera components such as a substrate, heat sink, and driver circuit 210, for example. In still other implementations, optical path 226 may be a fiber optic cable. In yet other implementations, optical path 226 may be a mirror. Such a configuration may be particularly applicable to implementations in which depth camera 200 is configured as a structured light camera, as the mirror may allow a portion of the illumination pattern to be fed back to image sensor 220, allowing changes to the illumination pattern to be measured. In particular, geometric changes to the illumination pattern from a nominal geometry may be detected, including but not limited to skewing, stretching, displacement, rotation, etc.

In alternate configurations, calibration light may be fed back to image sensor 220 without optical path 226. Instead, a component that reflects at least a portion of illumination light 205 back toward image sensor 220 may be used to capture calibration light. This component may be one of optical windows 230A and 230B, for example, or a single optical window for implementations in which illumination source 204, modulator 216, and image sensor 220, filter 222, and optical element 224 are positioned behind a single common optical window. In this example, while an optical window is substantially transmissive (e.g., 90% or greater transmittance) to incoming and/or outgoing light, the optical window may nevertheless exhibit non-negligible reflectance (e.g., 5% or less). As this reflected calibration light may be of relatively low intensity, data captured from a plurality of regions on image sensor 220 may be integrated to obtain a sufficient sample of the reflected calibration light. The intensity of reflected calibration light may remain low enough such that depth measurement is not adversely affected, however. In yet other implementations, a reflector may be positioned in optical window 230A, which may or may not be a hollow opening, such that a portion of illumination light 205 is transmitted through the optical window toward environment 206, while a complementary portion of the illumination light is not transmitted through the optical window but reflected back toward image sensor 220.

Other modifications to depth camera 200 are possible without departing from the scope of this disclosure. Optical path 226, for example, may be positioned in other manners—e.g., the optical path may instead route to image sensor 220 a portion of illumination light 205 before the illumination light reaches modulator 216. In another example, optical path 226 may route light immediately following transmission through an optically transmissive element upstream of optical window 230A but before the light is transmitted through the optical window—e.g., through boundary 231 where the light would otherwise cross from the interior of housing 228 to environment 206. Alternatively or additionally, optical path 226 may bypass one or both of optical element 224 and filter 222, in which case calibration light may be routed directly to image sensor 220 without undergoing transmission through the image sensor optics.

Depth camera 200 may include additional components not shown. For example, a diffuser may be positioned optically downstream from modulator 216 to enable diffusion of illumination light 205 so that the illumination light is spread throughout environment 206. Further, optical element 224 may include two or more lenses or other optical components. Still further, depth camera 200 may be modified such that illumination source 204 and image sensor 220, and at least some of their associated optics, are substantially aligned coaxially. In this example, a single optical window (and potentially an associated optically transmissive element) may be provided for the depth camera.

Controller 214 may perform various actions in response to the reception of calibration light. For configurations in which modulator 216 is implemented as a shutter, controller 214 may adjust the timing of the shutter, for example to reduce the delay between the shutter and emission of illumination light pulses from illumination source 204 and/or to modify the convolution of the shutter profile and light pulses to achieve a relatively more nominal convolution. Alternatively or additionally, controller 214 may interpret depth values determined based on output from image sensor 220 differently according to calibration light. For example, a detected deviation in the time of flight of calibration light may cause controller 214 to apply an offset to determined depth values. In some examples, controller 214 may maintain or access a data structure storing depth value offsets as a function of calibration light times of flight. It will be appreciated that depth value modification in this manner may be carried out algorithmically (e.g., in software) or in hardware. Other adjustments are possible, however, including but not limited to adjusting input signal 212 sent to driver circuit 210, adjusting supply voltages to electrical components, altering the time and/or duration of integrations performed by image sensor 220, etc.

Figure 4A:
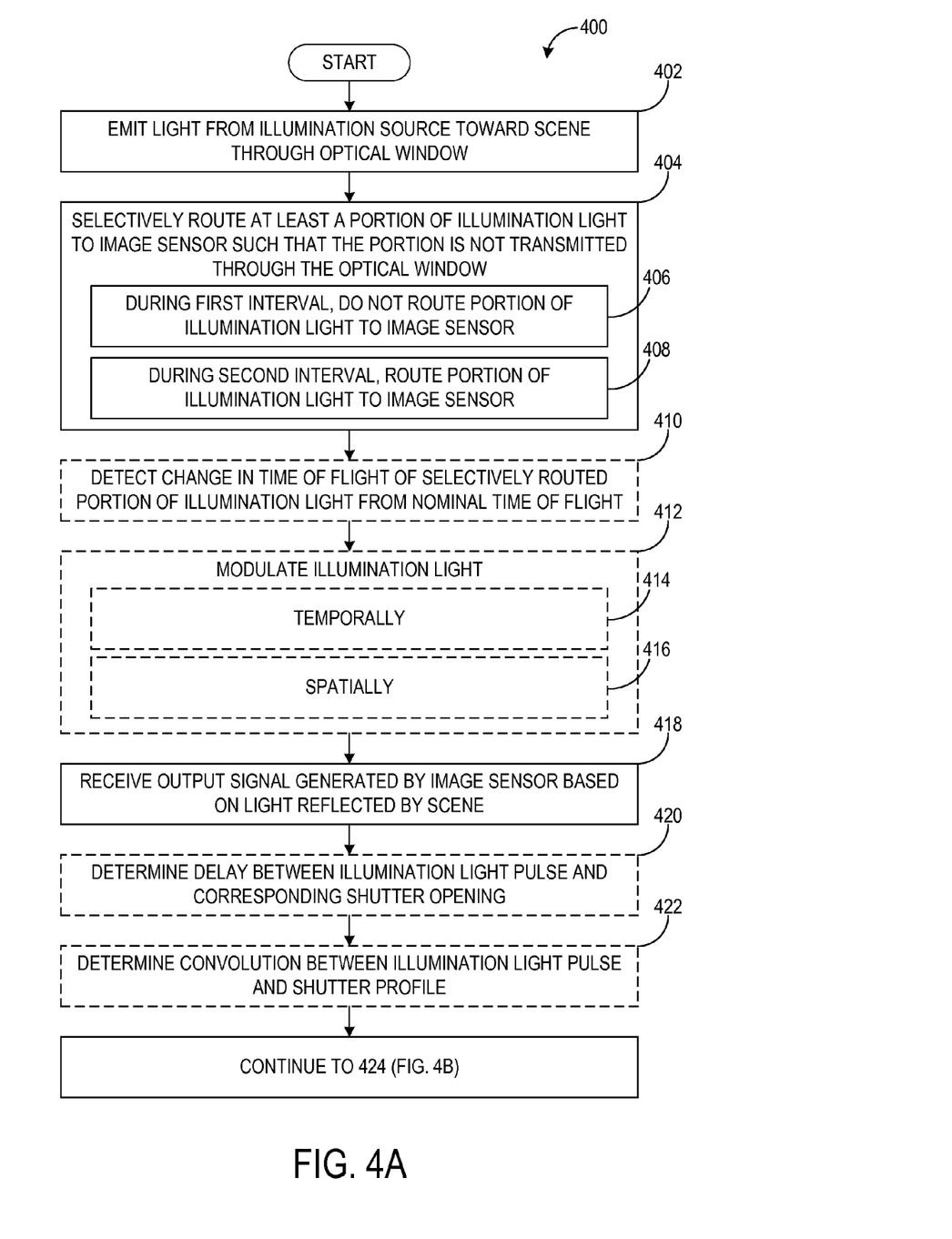
FIGS. 4A-B show a flowchart illustrating a method of controlling a depth camera based on calibration light.
Figure 4B:
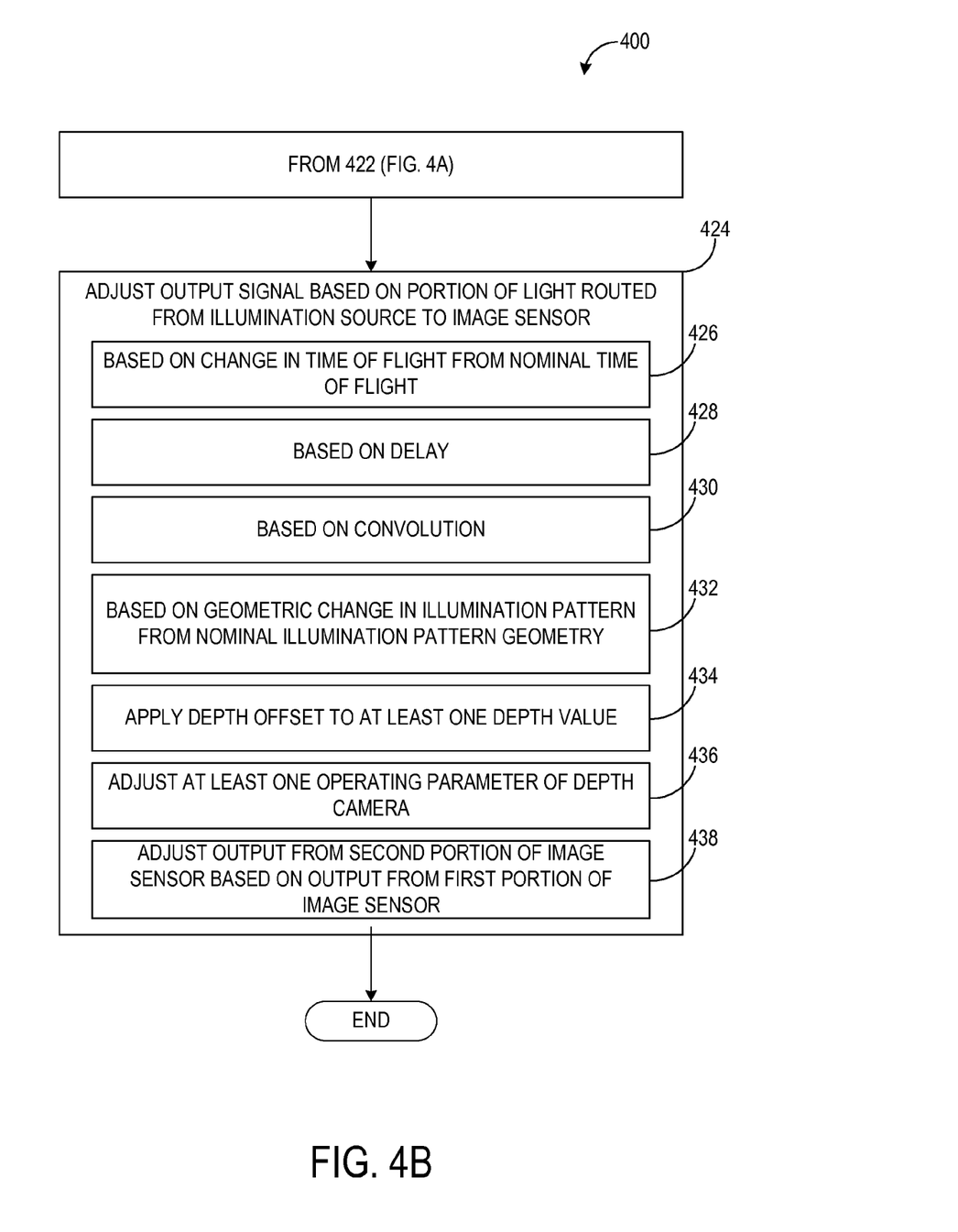

FIG. 4 shows a method 400 of controlling operation of a depth camera based on calibration light. Method 400 may be employed to control the operation of one or both of depth cameras 110 (FIG. 1) and 200 (FIG. 2), for example. Method 400 may be executed on controller 214 of FIG. 2, for example.

At 402 of method 400, light is emitted from an illumination source toward a scene through an optical window. The illumination source may be illumination source 204, while of the optical window may be optical window 230A, both of FIG. 2.

At 404 of method 400, at least a portion (e.g., subset) of the illumination light is selectively routed to an image sensor such that the portion of the illumination light is not transmitted through the optical window (e.g., across boundary 231 and into environment 206, both of FIG. 2). The image sensor may be image sensor 220 of FIG. 2, for example. The selectively routed portion of the illumination light may be routed by various suitable devices including a light pipe, light trace, waveguide, fiber optic cable, reflector (e.g., mirror), etc. Selectively routing the portion of the illumination light may include, at 406, not routing the portion of the illumination light during a first interval, and, at 408, routing the portion of the illumination light during a second interval different from the first interval. In this configuration, at least some region of a photosensitive surface of the image sensor may be used for both receiving light reflected from the scene and calibration light (e.g., the selectively routed portion of the illumination light) at certain times.

At 410 of method 400, a change in the time of flight of the selectively routed portion of the illumination light from a nominal time of flight may optionally be detected. As described above, the nominal time of flight may be determined during calibration of the depth camera and indicate nominal, calibrated operation of the depth camera. As such, detection of a deviation from the nominal time of flight may be interpreted as a deviation from the nominal, calibrated operation of the depth camera.

At 412 of method 400, the illumination light may optionally be modulated. The illumination light may be the portion of light not selectively routed, and may be modulated by modulator 216 (FIG. 2), for example. Modulating the illumination light may include, at 414, temporally modulating the illumination light (e.g., via a shutter). Modulating the illumination light may include, at 416, spatially modulating the illumination light (e.g., in a structured light configuration).

At 418 of method 400, an output signal generated by the image sensor based on light reflected from the scene is received. The light reflected from the scene may be the result of emitting the illumination light, and not the selectively routed portion of the illumination light, toward the scene.

At 420 of method 400, a delay between an illumination light pulse and a corresponding shutter opening may optionally be determined. The corresponding shutter opening may have been commanded by the controller, for example, in response to emission of the light pulse, which may be part of a modulated light pulse train in TOF implementations.

At 422 of method 400, a convolution between the illumination light pulse and a shutter profile may optionally be determined. As described above, the shutter profile may indicate the shutter position as a function of time, for example.

Continuing to FIG. 4B, at 424 of method 400, the output signal is adjusted based on the selectively routed portion of the illumination light routed from the illumination source to the image sensor. Adjustment of the output signal may include, at 426, adjusting the output signal based on the change in the time of flight of the selectively routed portion from the nominal time of flight as determined at 410. Adjustment of the output signal may include, at 428, adjusting the output signal based on the delay determined at 420. Adjustment of the output signal may include, at 430, adjusting the output signal based on the convolution determined at 422. Adjustment of the output signal may include, at 432, adjusting the output signal based on the geometric change in an illumination pattern from a nominal illumination pattern geometry (e.g., in a structured light implementation). Adjustment of the output signal may include, at 434, applying a depth offset to at least one depth value. The depth value may be determined by the controller based on the output signal generated from the reflected light from the scene. As described above, in some examples, depth value offsets may be retrieved from a suitable data structure by supplying calibration light time of flights as input. Adjustment of the output signal may include, at 436, adjusting at least one operating parameter of the depth camera. For example, a shutter timing may be adjusted to increase the synchronization of shutter timing with illumination light emission. Adjustment of the output signal may include, at 438, adjusting output from a second portion (e.g., peripheral region 304) of the image sensor based on output from a first portion of the image sensor (e.g., interior region 302) different from the second portion.

Thus, as shown and described, method 400 may be employed to adaptively adjust the output of a depth camera in real-time using a closed-loop configuration to dynamically compensate changes in the depth camera that might otherwise adversely affect depth sensing. Method 400 may facilitate such feedback by capturing a portion of light to be emitted into an environment prior to its emission into the environment, and monitor changes in the captured portion of the light from associated nominal values. As such, actual changes in the depth camera may be compensated throughout its operational life without the use of dedicated sensors or prediction mechanisms. Accordingly, stringent physical tolerances employed in construction of the depth camera may potentially be relaxed, reducing cost and complexity.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
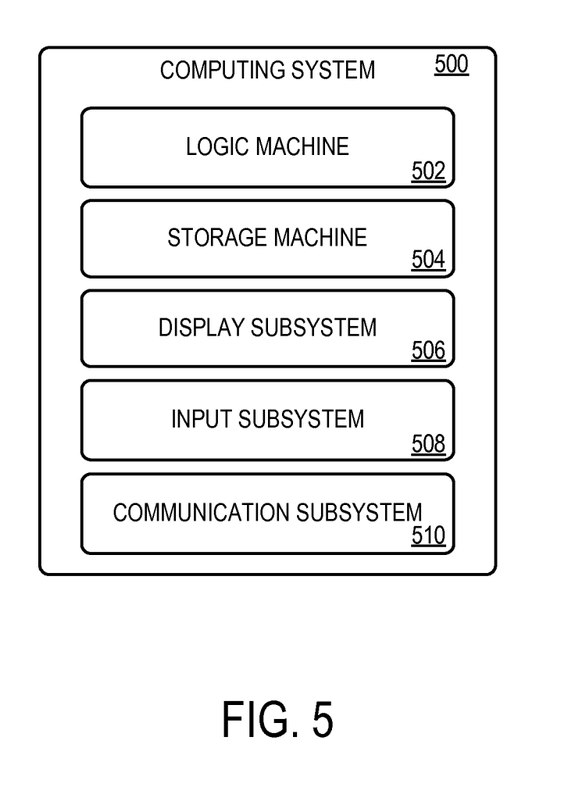
FIG. 5 shows a block diagram of an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/AS- SPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method, comprising:
   emitting light from an illumination source toward a scene through an optical window;
   routing, upstream of the optical window, at least a portion of the light emitted from the illumination source to an image sensor such that the portion of the light is not transmitted through the optical window;
   receiving an output signal generated by the image sensor based on light reflected by the scene, the output signal including at least one depth value of the scene; and
   adjusting the output signal based on the routed portion of the light.

2. The method of claim 1, further comprising detecting a change in a time of flight of the routed portion of light from a nominal time of flight, the output signal adjusted based on the change in the time of flight.

3. The method of claim 2, wherein adjusting the output signal based on the change in the time of flight includes applying a depth offset to the at least one depth value based on the change in the time of flight.

4. The method of claim 1, wherein the routed portion of light is a portion of an illumination pattern, the method further comprising detecting a geometric change in the portion of the illumination pattern from a nominal illumination pattern, the output signal adjusted based on the geometric change.

5. The method of claim 1, wherein the optical window is positioned optically downstream the illumination source, the optical window embedded in a housing at least partially enclosing the illumination source and the image sensor.

6. The method of claim 1, wherein the routed portion of the light is routed along an optical path extending from a modulator to the image sensor, an optical element and a filter being positioned along the optical path.

7. The method of claim 1, further comprising:
   modulating the light emitted from the illumination source via a shutter; and
   adjusting a timing of the shutter based on the routed portion of the light.

8. The method of claim 7, further comprising determining a delay between a light pulse emitted by the illumination source and a corresponding opening of the shutter, the output signal adjusted based on the delay.

9. The method of claim 7, further comprising determining a convolution between a light pulse emitted by the illumination source and a profile of the shutter.

10. The method of claim 1, wherein the routed portion of the light is routed to a first portion of the image sensor, and wherein the light reflected by the scene is received by a second portion of the image sensor, the second portion being different from the first portion.

11. The method of claim 10, wherein output from the second portion is adjusted based on output from the first portion.

12. The method of claim 1, wherein routing the portion of the light includes:

during a first interval, not routing the portion of the light to the image sensor; and during a second interval, routing the portion of the light to the image sensor, the second interval being different from the first interval.

13. An optical system, comprising:
    an illumination source configured to illuminate a scene with light;
    an optical window configured to transmit the light emitted from the illumination source to the scene;
    an image sensor configured to receive reflected light from the scene;
    an optical path configured to capture a subset of the light emitted from the illumination source before reaching the optical window and route the subset of the light to the image sensor; and
    a controller configured to determine at least one depth value of the scene based on the reflected light and the subset of the light.

14. The optical system of claim 13, wherein the optical path is one of a light pipe, a fiber optic cable, a waveguide, and a mirror.

15. The optical system of claim 13, wherein the controller is configured to determine the at least one depth value of the scene based on a change in a time of flight of the subset of the light from a nominal time of flight.

16. The optical system of claim 13, wherein the controller is configured to determine the at least one depth value of the scene based on a geometric change in a time of flight of the subset of the light from a nominal geometry.

17. The optical system of claim 13, wherein determining the at least one depth value includes:
    determining the at least one depth value based on the reflected light; and
    applying a depth offset to the at least one depth value based on the subset of the light.

18. The optical system of claim 13, wherein the reflected light is received at a first portion of the image sensor, and
    wherein the subset of the light is routed to a second portion of the image sensor, the second portion being different from the first portion.

19. A method of operating a depth camera, comprising:
    determining a nominal light pulse to be sent to an illumination source;
    illuminating a scene by emitting an illumination light pulse via the illumination source based on the nominal light pulse;
    feeding back at least a portion of the illumination light pulse to an image sensor; and
    adjusting at least one operating parameter of the depth camera based on a difference between the nominal light pulse and the illumination light pulse.

20. The method of claim 19, wherein the at least one operating parameter corresponds to one or both of a shutter timing and a depth value.

* * * * *